(12) United States Patent
Zampieri

(10) Patent No.: US 11,047,531 B2
(45) Date of Patent: Jun. 29, 2021

(54) CONTROL SYSTEM FOR A NATURAL GAS DISTRIBUTION NETWORK WITH THERMOELECTRIC GENERATOR AND VORTEX TUBE

(71) Applicant: Pietro Fiorentini S.P.A., Arcugnano (IT)

(72) Inventor: Nevio Zampieri, Montegalda (IT)

(73) Assignee: Pietro Fiorentini S.P.A., Arcugnano (IT)

( * ) Notice: Subject to any disclaimer, the term of this patent is extended or adjusted under 35 U.S.C. 154(b) by 0 days.

(21) Appl. No.: 16/319,723

(22) PCT Filed: Oct. 9, 2017

(86) PCT No.: PCT/IB2017/056210
§ 371 (c)(1),
(2) Date: Jan. 22, 2019

(87) PCT Pub. No.: WO2018/069807
PCT Pub. Date: Apr. 19, 2018

(65) Prior Publication Data
US 2019/0154203 A1 May 23, 2019

(30) Foreign Application Priority Data

Oct. 10, 2016 (IT) .................. 102016000101195

(51) Int. Cl.
*G05B 19/25* (2006.01)
*F17D 1/04* (2006.01)
(Continued)

(52) U.S. Cl.
CPC ............. *F17D 1/04* (2013.01); *F17C 13/04* (2013.01); *F17D 3/01* (2013.01); *F17D 5/02* (2013.01);
(Continued)

(58) Field of Classification Search
CPC ..... F17D 1/04; F17D 3/01; F17D 5/02; F17D 3/18; F17D 5/005; F17C 13/04; F17C 2221/033; G05B 19/25
(Continued)

(56) References Cited

U.S. PATENT DOCUMENTS

| 2001/0047621 A1 | 12/2001 | Arnold | |
| 2005/0167078 A1* | 8/2005 | Katefidis | ................. F25B 21/04 |
| | | | 136/201 |

(Continued)

FOREIGN PATENT DOCUMENTS

| DE | 10 2011 000492 A1 | 8/2012 |
| EP | 1 860 367 A1 | 11/2007 |
| EP | 2 713 412 A1 | 4/2014 |

OTHER PUBLICATIONS

International Search Report and Written Opinion dated Jan. 29, 2018, issued in PCT Application No. PCT/IB2017/056210, filed Oct. 9, 2017.

*Primary Examiner* — Kenneth M Lo
*Assistant Examiner* — Michael W Choi
(74) *Attorney, Agent, or Firm* — Workman Nydegger

(57) ABSTRACT

A control system for a natural gas distribution network, includes: a processing unit suited to communicate, through corresponding signals, with one or more control devices operatively connected to the distribution network; a rechargeable battery which supplies power to the processing unit; a power supply device suited to recharge the rechargeable battery. The power supply device includes: a thermoelectric generator connected to the rechargeable battery; a first heat exchanger and a second heat exchanger respectively in contact with two opposite sides of the thermoelectric generator; a vortex tube which receives part of the natural gas from the distribution network and divides it into a colder portion and into a warmer portion; a first duct suited (Continued)

to convey the colder portion into the first heat exchanger; a second duct suited to convey the warmer portion into the second heat exchanger.

17 Claims, 3 Drawing Sheets

(51) Int. Cl.
*F17D 3/01* (2006.01)
*F17C 13/04* (2006.01)
*F17D 5/02* (2006.01)
*F17D 3/18* (2006.01)
*F17D 5/00* (2006.01)

(52) U.S. Cl.
CPC ........ *G05B 19/25* (2013.01); *F17C 2221/033* (2013.01); *F17D 3/18* (2013.01); *F17D 5/005* (2013.01)

(58) Field of Classification Search
USPC .......................................................... 700/282
See application file for complete search history.

(56) References Cited

U.S. PATENT DOCUMENTS

| | | | |
|---|---|---|---|
| 2011/0056571 A1* | 3/2011 | Bayliff | F17C 7/00 137/14 |
| 2012/0012146 A1* | 1/2012 | Salzgeber | H01L 35/30 136/205 |
| 2015/0027507 A1* | 1/2015 | Noui-Mehidi | H01L 35/30 136/201 |
| 2017/0213951 A1* | 7/2017 | Kim | H02J 7/0072 |
| 2018/0181147 A1* | 6/2018 | Bodei | G05D 16/163 |

* cited by examiner

CONTROL SYSTEM FOR A NATURAL GAS DISTRIBUTION NETWORK WITH THERMOELECTRIC GENERATOR AND VORTEX TUBE

BACKGROUND OF THE INVENTION

1. The Field of the Invention

The present invention concerns a natural gas distribution network, and in particular it concerns a distribution network suited to distribute low pressure natural gas to the users.

The present invention concerns also a control system and a method for controlling said network.

2. The Relevant Technology

As is known, natural gas is distributed to the users through suitable distribution networks that provide for maintaining the delivery pressure to the users as constant as possible, independently of the network feed pressure and of the delivery flow rate.

The maintenance of the delivery pressure at a constant level is ensured by the presence of a pressure reducer unit arranged along a duct of the distribution network and suited to reduce the network feed pressure to the value required at the users. In particular, the pressure reducer unit comprises a movable shutter arranged in the duct in such a way as to define a bottleneck that causes said pressure reduction, which can be modified by changing the position of the shutter. A sensor unit detects the gas conditions instant by instant and if the pressure value is different from a predetermined delivery value the position of the shutter is modified in such a way as to change the pressure drop until the delivery pressure returns to said predetermined value.

According to a known embodiment, the movements of the shutter are controlled by a control system comprising an electronic processing unit that receives input data from the sensor unit and processes them, sending out a control signal capable of piloting the pressure reducer unit as described above.

Said processing unit can be used also to control other control devices associated with the distribution network, for example valves and similar elements, for the purpose of controlling the operating conditions of the network.

The processing unit comprises a power supply battery which, in addition to supplying power to the processing unit itself, is capable of supplying power also to the sensor unit and the control devices with which the processing unit interacts. The use of the power supply battery makes the control system autonomous and, in particular, allows the latter to operate also in isolated places not served by the electricity network, with obvious advantages in terms of flexibility of use.

On the other hand, said power supply battery poses the drawback that it has limited autonomy and therefore needs to be periodically replaced.

It is known that in order to solve the above mentioned drawback rechargeable batteries are used, which are connected to power supply devices on site, for example solar panels.

For example, the patent document US 2001/047621 discloses, for a control system for a natural gas distribution network, a solution in which a rechargeable battery is used to supply power to a processing unit and an auxiliary device for recharging the rechargeable battery.

The power supply devices of the known type generally pose the drawback of being expensive and, in the case of solar panels, of being subject to theft.

Solar panels pose the further drawback of requiring suitable insulation, which is not available everywhere.

SUMMARY OF THE INVENTION

The present invention intends to overcome the drawbacks mentioned above with reference to the natural gas distribution networks of the known types described above.

In particular, it is the object of the present invention to control a natural gas distribution network without the need of an external power supply source, in particular a connection to an electricity network.

It is a further object of the present invention to obtain this result at a lower cost compared to the cost to be borne when using control techniques of the known type described above.

Said objects are achieved by a control system carried out according to the claim. Said objects are also achieved by a natural gas distribution network comprising said control system according to the claims, and by a method for controlling a natural gas distribution network according to the claims.

Further characteristics and details of the invention are illustrated in the respective dependent claims.

BRIEF DESCRIPTION OF THE DRAWINGS

Said objects and advantages are highlighted in the following description of some preferred embodiments of the invention, which are provided by way of non-limiting example with reference to the attached drawings, wherein.

DETAILED DESCRIPTION OF THE PREFERRED EMBODIMENTS

Figure 1:
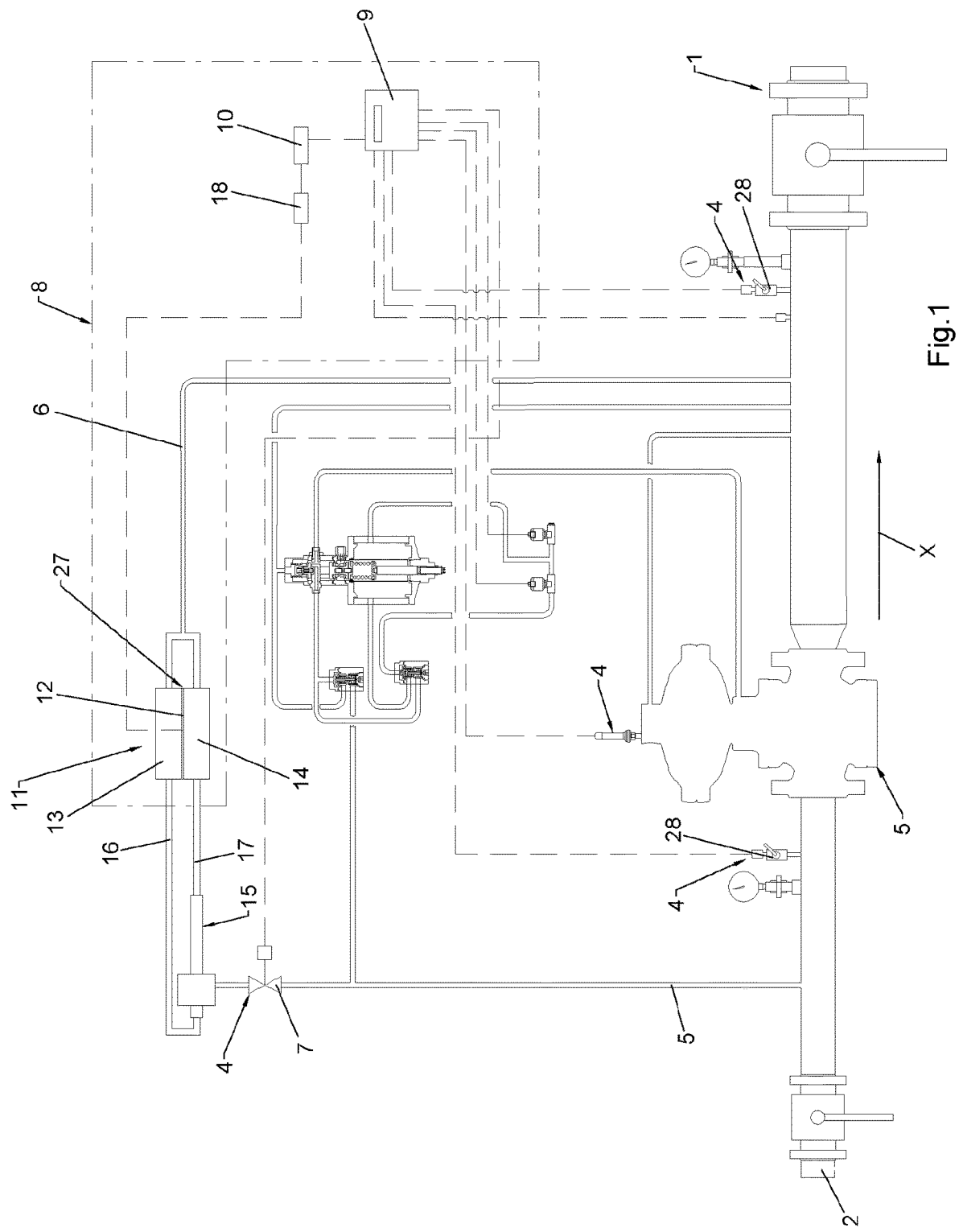
FIG. 1 shows a schematic view of the distribution network which is the subject of the invention.

The invention is applied to a natural gas distribution network indicated as a whole by 1 in FIG. 1 and comprising a main duct 2 for the passage of a flow rate of natural gas according to a flow direction X.

Along the main duct 2 there is a pressure reducer unit 3 suited to cause the pressure to be reduced from a given feeding value upstream of the pressure reducer to a predetermined delivery value downstream of the pressure reducer itself, independently of said feeding value and of the gas flow rate along the duct.

Preferably but not necessarily, the pressure reducer unit 3 comprises a movable shutter, not illustrated in the drawings but known per se, arranged in the main duct 2 in such a way as to generate a bottleneck in the latter. The cross section of the bottleneck can be adjusted by moving the shutter itself.

The pressure reducer unit 3 furthermore comprises a motorization chamber delimited by a membrane which is connected to the movable shutter, in such a way that a pressure variation in the motorization chamber causes the movement of the membrane and, consequently, of the movable shutter. In turn, the pressure in the motorization chamber is adjusted by a pilot device based on the pressure of the natural gas downstream of the pressure reducer unit 3.

The distribution network 1 furthermore comprises one or more control devices 4 operatively connected to the main duct 2 so as to interact with the natural gas flowing therein.

For example, one of said control devices can interact with the pressure reducer unit 3 in such a way as to correct the pressure setting value adjusted downstream of the pressure reducer unit 3 itself according to changing operational needs in the network, for example when switching from day operation to night operation.

In a solution known per se, said control device may comprise a tank connected to the main duct 2 through two solenoid valves that can be respectively operated to let gas into the tank and to let it out of the thank, in such a way as to increase or decrease the pressure inside it. The tank is placed in communication with a pneumatic actuator operatively associated with the movable shutter in order to exert an additional force on the latter. The operation of the two solenoid valves based on the temperature of the gas present in the main duct 2 makes it possible to obtain the correction mentioned above. More generally, said control devices 4 may comprise solenoid valves, or more generally actuators, suited to be activated by corresponding signals in order to affect the operating parameters of the distribution network.

Said control devices 4 may also comprise a sensor unit 28 which measures the values of one or more physical parameters of natural gas and converts them into corresponding signals. Said physical parameters may comprise the pressures and/or temperatures upstream and/or downstream of the pressure reducer unit 3 and/or the flow rate of the natural gas along the main duct 2.

Said control devices 4 may also comprise devices suited to indicate other operating parameters of the network, not illustrated in the drawings but known per se.

It should be underlined since now that in the present description the word "signal" indicates any signal suited to be transmitted from a remote location in analog or digital form, particularly but not exclusively an electrical signal.

The distribution network 1 comprises also a control system 8 suited to communicate with said control devices 4. In particular, the control system 8 comprises a processing unit 9 which communicates with the control devices 4 through said signals. Preferably, the processing unit 9 receives the signals sent out by said sensor unit 28 and processes them in such a way as to emit output signals intended to activate one or more of said actuators.

The processing unit 9 is powered by a battery 10 in order to allow the control system 8 to operate autonomously and with no need to be connected to an external power supply source, for example an electricity network.

Preferably, the rechargeable battery 10 is used also to supply power to the control devices 4, with the advantage of making the entire distribution network 1 autonomous. In particular, both the power supply of the control devices 4 and the respective signals can be transmitted through a single connection cable. In the case of the actuators, the signals that activate them can be used also to power them.

The battery 10 is rechargeable and is connected to a power supply device 11 suited to recharge it. The latter advantageously allows the control system 8 to work continuously for long periods with no need to replace the battery 10.

According to the invention, the power supply device 11 comprises a thermoelectric generator 12 connected to the rechargeable battery 10. As is known, a thermoelectric generator 12 is a device that, exploiting the known "Seebeck effect", transforms a temperature difference between its two ends into a voltage.

In particular, according to the invention said difference in temperature is created by means of a vortex tube 15. As is known, a vortex tube, also known as Ranque-Hilsch tube, is a tubular body that receives a gas through an inlet mouth and divides it into a gas stream which is colder than the inflowing gas, in the area nearer to the axis of the tubular body, and in a gas stream which is warmer than the inflowing gas, in the more external area of the tubular body.

According to the invention, the difference in pressure between the two sides of the pressure reducer unit 3 is used to cause a part of the natural gas to flow through said vortex tube 15 and the difference in temperature between the two portions of natural gas made available at the outlets of the vortex tube 15 is used in said thermoelectric generator 12 to recharge the battery 10.

It can be understood that the system just described above makes it possible to exploit the pressure of the natural gas flowing along the main duct 2 to recharge the battery 10 and, as such, requires neither an external power supply source, nor the installation of a generator device of the known type such as, for example, a solar panel or another equivalent device.

In particular, the system which is the subject of the invention requires less maintenance compared to said generator devices of the known type, as it has no moving mechanical parts and no parts subject to wear.

Figure 2:
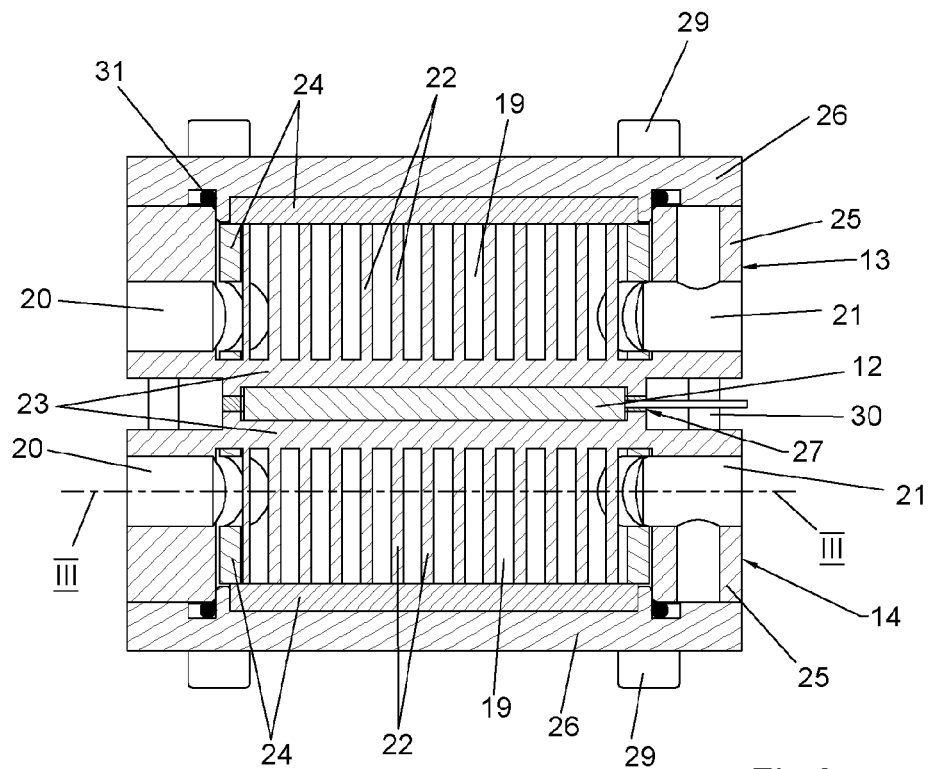
FIG. 2 shows a component of the distribution network of FIG. 1 in a side sectional view.
Figure 3:
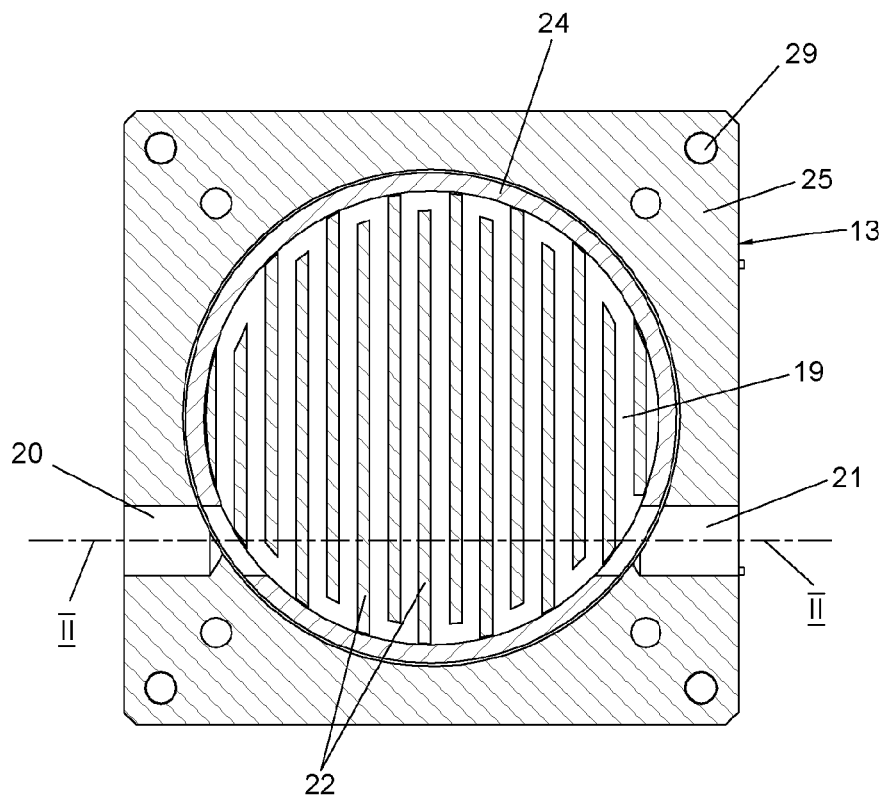
FIG. 3 shows the component of FIG. 2, in a plan sectional view.

Preferably, and as shown in FIGS. 2 and 3, the conversion of the pressure of natural gas into voltage takes place through a first heat exchanger 13 and a second heat exchanger 14 which are respectively in contact with two opposing faces of the thermoelectric generator 12.

The colder portion of natural gas flowing out of the vortex tube 15 is conveyed towards the first heat exchanger 13 through a first conveyance duct 16, while the warmer portion is conveyed towards the second heat exchanger 14 through a second conveyance duct 17.

A first duct 5 makes it possible to convey the natural gas from the main duct 2, upstream of the pressure reducer unit 3, to the inlet mouth of the vortex tube 15. Said gas is then drawn at the exit of the heat exchangers 13, 14 and reintroduced in the main duct 2 downstream of the pressure reducer unit 3 through a second duct 6.

Preferably, one of said solenoid valves, indicated by 7 in FIG. 1, is arranged along the first duct 5 which connects the inlet of the vortex tube 15 to the main duct 2 upstream of the pressure reducer unit 3.

In an alternative variant embodiment not illustrated in the figures, said solenoid valve 7 can be arranged along the second duct 6 that connects the heat exchangers 13, 14 to the main duct 2 downstream of the pressure reducer unit 3. In both cases, said solenoid valve advantageously makes it possible to close the circuit that feeds the vortex tube 15 in case of scarce demand or no demand at all, in such a way as to prevent the pressure downstream of the pressure reducer unit 3 from increasing and exceeding the predetermined delivery value.

Alternatively, the interruption of the flow through the vortex tube 15 can take place through a pneumatic device, not illustrated in the figures but known per se. For example, said pneumatic device may comprise a secondary pressure regulator set in such a way that it closes the flow at a pressure value below the setting value of the pressure reducer unit 3.

Preferably, each heat exchanger 13, 14 comprises a corresponding chamber 19 provided with an inlet mouth 20 and an outlet mouth 21. In the figures, the shape of the chamber 19 in plan view is circular, but in variant embodiments of the invention said shape can obviously be different.

A plurality of segments 22 in contact with the thermoelectric generator 12 is interposed between the mouths 20, 21 of the chamber 19. Advantageously, the segments 22 increase the heat exchange surface between the gas and the thermoelectric generator 12, thus increasing the heat exchange efficiency.

Preferably, the segments 22 are arranged in such a way as to force the natural gas flowing in the chamber 19 to follow a winding path between the inlet mouth 20 and the outlet mouth 21, with the advantage of increasing the flowing time inside the chamber 19 and consequently the efficiency of the heat exchange.

Preferably, the path just described above is obtained by arranging a first series of segments with an end connected to a wall of the chamber 19 and with the opposite end spaced from the opposite wall of the chamber 19 and facing it, in such a way as to define a corresponding passage for the gas. The segments of the first series are alternated with a second series of segments analogous to those of the first series, but whose ends are arranged opposite the segments of the first series with respect to the two opposite walls of the chamber 19. In the configuration just described above, the passages for the gas are alternatively adjacent to the two opposite walls of the chamber 19, so as to define a serpentine path that enhances the advantages mentioned above.

Preferably, the chamber 19 is delimited, on its side facing the thermoelectric generator 12, by a first wall 23 made of a heat conducting material and placed in contact with the thermoelectric generator 12 itself, while on the remaining sides it is delimited by a second wall 24 made of a heat insulating material.

Advantageously, the second wall 24 prevents the gas flowing in the respective heat exchanger 13, 14 from exchanging heat with the outside instead of with the thermoelectric generator 12.

Preferably, the segments 22 are arranged in contact with the first wall 23, so as to obtain the maximum heat exchange efficiency.

According to a variant embodiment of the invention not illustrated herein, the first wall 23 may belong to the thermoelectric generator 12, in which case the segments 22 can be arranged in direct contact with the generator itself.

Preferably, the chamber 19, the inlet mouth 20, the outlet mouth 21 and the first wall 23 of each heat exchanger 13, 14 belong to a respective containment body 25 made in a single piece from a heat conducting material.

Advantageously, the configuration just described above makes it possible to obtain more efficient heat exchangers, to reduce their overall dimensions and to reduce the number of components they comprise, thus reducing the respective assembly cost.

Still advantageously, said configuration makes it possible to reduce the number of gaskets needed to prevent the outflow of gas from the chambers 19.

Preferably, also the segments 22 belong to the containment body 25, enhancing the advantages described above.

Still preferably, a portion of the second wall 24 which is opposite the first wall 23 with respect to the chamber 19 belongs to a cover 26 made separately from the containment body 25 and suited to be removably associated with it.

Advantageously, the cover 26 facilitates the construction of the chamber 19, for example through a die-casting and/or mechanical machining process.

Preferably, the cover 26 is associated with the respective containment body 25 through one or more screws and, even more preferably, a gasket, for example an O ring 31, which makes the chamber 19 tight, is interposed therebetween.

As regards the thermoelectric generator 12, it preferably assumes the shape of a square or rectangular small plate of the type commonly available on the market, or of several plates placed side by side and connected to one another.

Preferably, the thermoelectric generator 12 is housed in an intermediate element 27 made of a heat insulating material, which separates the two heat exchangers 13, 14 from each other.

The latter are preferably connected to each other through screws 30 which maintain them in contact with the thermoelectric generator 12 and which also allow the intermediate element 27 to be maintained in position. Said screws 30 also make it possible to improve the contact between the surfaces of the heat exchangers 13, 14 and of the thermoelectric generator 12 for the purpose of optimizing the performance of the latter.

Figure 4:
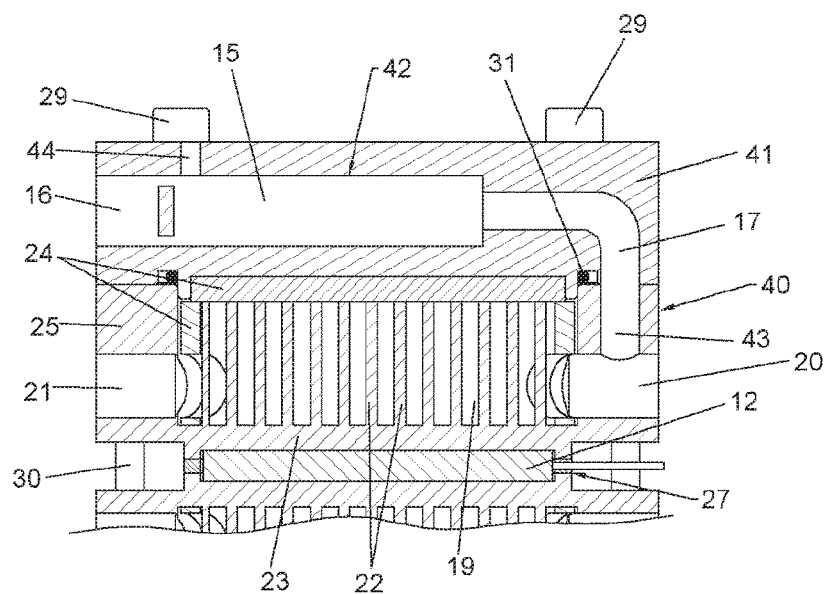
FIG. 4 shows a variant of the component of FIG. 2, in a side sectional view.

In the variant embodiment illustrated in FIG. 4, the vortex tube 15 is housed in the cover 41 of the second heat exchanger, here indicated by 40. Advantageously, this configuration makes it possible to transfer heat from the hot external surface of the vortex tube 15 directly to the cover 41, thus increasing the overall efficiency of the heat exchange.

In this variant embodiment, the second conveyance duct 17 partially belongs to the cover 41, in such a way that the hot gas flowing out of the vortex tube 15 is conveyed directly into the respective chamber 19, with the advantage of limiting the length of the second conveyance duct 17 and, therefore, gas pressure drops along it, as well as gas heat dissipation towards the outside.

Preferably, the second conveyance duct 17 is provided with an extension 43 belonging to the containment body 25 of the second heat exchanger 40 in such a way as to be connected to the inlet mouth 20 of the chamber 19.

Furthermore, preferably, also the inlet mouth of the vortex tube 44 belongs to the containment body 25.

Preferably, the vortex tube 15 is obtained directly in the cover 41, in such a way that the cover 41 also serves as body of the vortex tube 15. More specifically, the vortex tube 15 is delimited by a hole 42 belonging to the cover 41. This configuration makes it possible to further increase the heat exchange efficiency, to make the exchanger-vortex tube system more compact, to optimize the geometry of the vortex tube and to reduce construction complexity.

Figure 5:
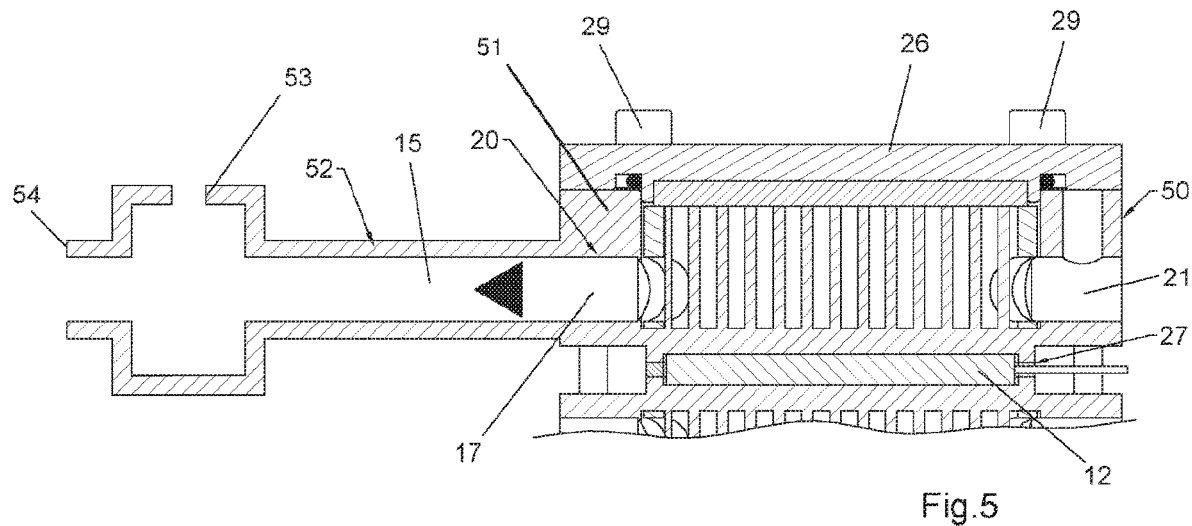
FIG. 5 shows a further variant of the component of FIG. 2, in a side sectional view.

According to a further variant embodiment illustrated in FIG. 5, the vortex tube 15 is made as an extension of the cover 51 of the second heat exchanger 50, preferably in a single piece with it. In particular, the vortex tube 15 is delimited by a hole 52 belonging to the cover 51, whose hot outlet is in direct communication with the inlet mouth 20 of the second heat exchanger 50.

Advantageously, the configuration described above practically makes it possible to make the length of the second conveyance duct 17 equal to zero, minimizing pressure drops in the same. Furthermore, this configuration also makes it possible to limit the height of the second heat exchanger 50 compared to the previous case, though maintaining at least partially the advantage of transferring heat by conduction from the hot external surface of the vortex tube 15 to the cover 51. In particular, the cover 26 of the second heat exchanger 50 can be substantially equal to that used in the first embodiment described above.

In FIG. 5, the vortex tube 15 is fed through the inlet mouth 53, while the cold stream is made available to the cold outlet mouth 54, which is connected to the first cold heat exchanger 13.

Preferably, in all of the embodiments described above, there is also a voltage booster device 18 interposed between the thermoelectric generator 12 and the rechargeable battery 10, suited to increase the voltage produced by the thermoelectric generator 12 and bring it to a value sufficient to power the rechargeable battery 10.

Advantageously, said voltage booster device 18 makes it possible to limit the flow rate of gas deviated towards the vortex tube 15 and thus towards the heat exchangers 13, 14, especially in applications in distribution networks for low pressure users, thus limiting the size of said components. Furthermore, since the gas flow rate which is deviated towards the vortex tube does not pass through the pressure reducer unit 3 and, therefore, affects the pressure downstream of the reducer unit, limiting said deviated flow rate makes it possible to control the pressure downstream of the reducer unit in a more precise manner.

By way of example, the applicant filing the present invention has carried out some tests on the system described above in a low pressure distribution network, in which the relative pressure of the natural gas upstream and downstream of the pressure reducer unit is respectively about 1.5 bars and 20 mbars. A processing unit has been used whose average consumption is equal to approximately 8.5 mA, with peaks of 50 mA when it is necessary to pilot the control devices intended to regulate the gas pressure.

In the case described above, it has been possible to obtain a current of approximately 15 mA from the thermoelectric generator 12, a current which is more than sufficient to satisfy the average consumption mentioned above.

In particular, the voltage increasing device 18 has made it possible to increase the voltage at the ends of the thermoelectric generator 12, equal to approximately 3.6 V, to a value of approximately 4.2 V, which is sufficient to recharge a lithium battery that powers the processing unit with a voltage of 3.75 V.

According to the above, it can be understood that the control system which is the subject of the invention allows the set objects to be achieved.

In particular, by exploiting the difference in pressure between the points upstream and downstream of the pressure reducer unit of the distribution network to power the vortex tube connected to a thermoelectric generator, it is possible to obtain a current that is sufficient to recharge the battery of the processing unit controlling the devices intended to control the operating conditions of the natural gas. This eliminates the need to periodically replace the battery and also the need to provide a costly generator to recharge the battery itself, for example solar panels, where no electricity network is available.

In particular, the invention makes it possible to power the control devices exclusively through the rechargeable battery, making the control system completely autonomous.

The invention claimed is:

1. A natural gas distribution network, comprising:
   a main duct suited to convey a flow rate of natural gas according to a certain flow direction (X);
   a pressure reducer unit arranged along said main duct;
   one or more control devices operatively connected to said main duct so as to interact with said natural gas flowing in said main duct; and
   a control system configured to communicate with said control devices through corresponding signals, said control system comprising:
      a processing unit suited to communicate, through corresponding signals, with one or more control devices operatively connected to said distribution network;
      a rechargeable battery which supplies power to said processing unit; and
      a power supply device suited to recharge said rechargeable battery, said power supply device comprising:
         a thermoelectric generator connected to said rechargeable battery;
         a first heat exchanger and a second heat exchanger respectively in contact with two sides of said thermoelectric generator opposing each other;
         a vortex tube configured to receive a portion of natural gas from said distribution network and to divide said portion into a part which is colder than said portion of natural gas flowing into said vortex tube, and a part which is warmer than said portion of natural gas flowing into said vortex tube;
         a first conveyance duct suited to convey said colder part into said first heat exchanger; and
         a second conveyance duct suited to convey said warmer part into said second heat exchanger,
   wherein said vortex tube of said control system communicates with said main duct upstream of said pressure reducer unit according to said flow direction (X) through a first duct in order to intercept a portion of said flow rate of natural gas, wherein the two heat exchangers of said control system communicate with said main duct downstream of said pressure reducer unit through one or more second ducts which are suited to reintroduce said portion of flow rate into said main duct, said processing unit of said control system being configured to communicate with said one or more control devices through said signals.

2. The distribution network according to claim 1, wherein said power supply device comprises a voltage booster device interposed between said thermoelectric generator and said rechargeable battery in order to increase the voltage produced by said thermoelectric generator and reach a value that is sufficient to power said rechargeable battery.

3. The distribution network according to claim 1, wherein each heat exchanger comprises a corresponding chamber provided with an inlet mouth and an outlet mouth with a plurality of segments interposed therebetween, said segments defining a winding path for said natural gas from the point where it flows into said chamber through said inlet mouth to the point where it flows out of the same through said outlet mouth, said segments being in contact with said thermoelectric generator.

4. The distribution network according to claim 3, wherein said chamber is delimited, on the side facing said thermoelectric generator, by a first wall made of a heat conducting material and in contact with said thermoelectric generator and, on the remaining sides, by a second wall made of a heat insulating material.

5. The distribution network according to claim 4, wherein said chamber, said inlet mouth, said outlet mouth and said first wall belong to a containment body made in a single piece and from a heat conducting material.

6. The distribution network according to claim 5, wherein a portion of said second wall opposite said first wall with respect to said chamber belongs to a cover which is suited to be removably associated with said containment body.

7. The distribution network according to claim 5, wherein said vortex tube is housed in said cover, said second conveyance duct belonging to said cover.

8. The distribution network according to claim 7, wherein said cover comprises a hole which delimits said vortex tube.

9. The distribution network according to claim 1, wherein said thermoelectric generator is housed in an intermediate element made of a heat insulating material which separates the two heat exchangers from each other.

10. The distribution network according to claim 1, wherein said processing unit is configured to receive one or more input signals representing corresponding physical parameters of said natural gas flowing along a main duct and to convert them into one or more output signals suited to activate one or more actuators interacting with said natural gas which flows along said main duct.

11. The distribution network according to claim 1, wherein said one or more control devices comprise a valve suited to be operated by a corresponding signal of said signals.

12. The distribution network according to claim 11, wherein said valve belongs to said pressure reducer unit.

13. The distribution network according to claim 11, wherein said valve is arranged along said first duct or along said one or more second ducts.

14. The distribution network according to claim 1, wherein said one or more control devices comprise a sensor unit suited to measure the values of one or more physical parameters of said natural gas and convert them into said corresponding signals.

15. The distribution network according to claim 1, wherein said one or more control devices are powered exclusively by said rechargeable battery of said control system.

16. The distribution network according to claim 1, wherein said pressure reducer unit is in said main duct.

17. The distribution network according to claim 1, wherein said pressure reducer unit comprises a movable shutter in said main duct.

* * * * *